United States Patent
Putcha et al.

(10) Patent No.: US 10,577,201 B2
(45) Date of Patent: Mar. 3, 2020

(54) AUTOMATED VEHICLE LOADING

(71) Applicant: Walmart Apollo, LLC, Bentonville, AR (US)

(72) Inventors: Sai Phaneendra Sri Harsha Viswanatha Putcha, Bentonville, AR (US); Luke Reynolds, Dallas, TX (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 16/183,490

(22) Filed: Nov. 7, 2018

(65) Prior Publication Data

US 2019/0135558 A1 May 9, 2019

Related U.S. Application Data

(60) Provisional application No. 62/583,175, filed on Nov. 8, 2017.

(51) Int. Cl.
 *B65G 67/20* (2006.01)
 *B65G 67/08* (2006.01)

(52) U.S. Cl.
 CPC ............ *B65G 67/20* (2013.01); *B65G 67/08* (2013.01); *B65G 2201/0235* (2013.01)

(58) Field of Classification Search
 None
 See application file for complete search history.

(56) References Cited

U.S. PATENT DOCUMENTS

| | | | |
|---|---|---|---|
| 2,346,659 A | 4/1944 | John | |
| 4,923,357 A | 5/1990 | Isogai | |
| 4,941,794 A | 7/1990 | Hara et al. | |
| 5,403,142 A | 4/1995 | Stewart | |
| 5,834,706 A | 11/1998 | Christ | |
| 9,623,569 B2* | 4/2017 | McCollum | B25J 9/0093 |
| 9,688,249 B2* | 6/2017 | Chun | B60S 1/08 |
| 9,688,489 B1* | 6/2017 | Zevenbergen | B65G 67/20 |
| 10,048,697 B1* | 8/2018 | Theobald | B65G 41/006 |
| 10,173,573 B2* | 1/2019 | Jones | B60P 1/38 |
| 2009/0277753 A1 | 11/2009 | Violle | |
| 2012/0160636 A1 | 6/2012 | Windfeld et al. | |
| 2016/0167888 A1* | 6/2016 | Messina | B65G 41/008 198/315 |
| 2016/0264366 A1* | 9/2016 | Heitplatz | B65G 21/14 |

(Continued)

OTHER PUBLICATIONS

International Search Report and Written opinion dated Jan. 16, 2019, issued in corresponding PCT Application No. PCT/US2018/059655.

(Continued)

*Primary Examiner* — Mark C Hageman
(74) *Attorney, Agent, or Firm* — Venable LLP; Jeffri A. Kaminski

(57) ABSTRACT

A system for moving merchandize from a warehouse to a vehicle is described herein. The system includes a movable conveyor belt system configured to move on a plurality of rollers in a two degrees of freedom, and one or more lift systems attached to the movable conveyor belt system. The system also includes one or more configurable panels mounted to the movable conveyor belt system via the one or more lift systems, the one or more configurable panels being configured to hold merchandize to be lifted by the one or more lift systems.

20 Claims, 3 Drawing Sheets

(56) References Cited

U.S. PATENT DOCUMENTS

2017/0259722 A1  9/2017 Jones et al.
2017/0267456 A1  9/2017 Itoh et al.
2018/0142427 A1* 5/2018 Tkachenko .......... G05D 1/0293

OTHER PUBLICATIONS

Actiw LoadMatic—automated trailer loading of Petrochemical bags, https://youtu.be/Z61mrNSVoAl.
Automatic trailer and container loading solution for Big Bags by Actiw LoadMatic, https://www.youtube.com/watch?v=v-Z_gYD4k_g.
Revolutionary truck and container loading solution—ACTIW LoadMatic for automated pallet loading, https://www.youtube.com/watch?v=IHodUlroixM.
Tech Logic's Vertical Sandwich Conveyor in Action, https://www.youtube.com/watch?v=I8Kq3QEo6Yc.

* cited by examiner

AUTOMATED VEHICLE LOADING

CROSS REFERENCE TO RELATED APPLICATIONS

The present Patent Application claims priority benefit from U.S. Provisional Patent Application No. 62/583,175 filed on Nov. 8, 2017, the entire content of which is incorporated herein by reference.

BACKGROUND

1. Technical Field

The present disclosure relates generally to transport of material and logistics and more specifically to systems for automated vehicle loading.

2. Introduction

Conveyor systems are commonly used to move material or merchandize from one location to another location. Conveyor systems provide for efficient transport of material (e.g., packages). There are many kinds of conveyor systems depending on various user needs and the type of material to be transported. For example, conveyor systems are used in many industries such as mining, automotive, agricultural, computer, electronic, food processing, aerospace, pharmaceutical, chemical, bottling, canning, and various packaging industries, retail and warehousing.

Conveyor systems include frames that support rollers, wheels, or belts and may be motor powered or manually operated. One type of conveyor system is a belt conveyor system which is commonly used in postal sorting and airport luggage handling systems. Other types include apron/slat conveyors, ball transfer conveyors, beltless magnetic conveyors, roller conveyors, screw conveyors, chute conveyors, etc. Some conveyor systems are movable on the ground as they are provided with wheels or rollers. An example of such conveyor system is the NestaFlex® flexible conveyor system, manufactured by Conveyors and Drives, Inc.

However, the above conveyor systems are not fully automated and do not have the ability to lift packages for loading into a vehicle. Therefore, there is a need for a novel system for automated vehicle loading. The systems disclosed herein cure the above and other problems of existing techniques and systems.

SUMMARY

An aspect of the present disclosure is to provide a system for moving merchandize from a warehouse to a vehicle. The system includes a movable conveyor belt system configured to move on a plurality of rollers in a two degrees of freedom; and one or more lift systems attached to the movable conveyor belt system. The system further includes one or more configurable panels mounted to the movable conveyor belt system via the one or more lift systems, the one or more configurable panels being configured to hold merchandize to be lifted by the one or more lift systems.

Another aspect of the present disclosure is to provide a system for moving merchandize from a warehouse to a vehicle. The system includes a movable conveyor belt system configured to move on a plurality of rollers in a two degrees of freedom, the conveyor belt system being provided with one or more sensors configured to automatically search for a corresponding sensor provided at a loading entrance of the vehicle for loading the merchandize. The system further includes one or more lift systems attached to the movable conveyor belt system; and one or more configurable panels mounted to the movable conveyor belt system via the one or more lift systems, the one or more configurable panels being configured to hold merchandize to be lifted by the one or more lift systems. The system also includes one or more actuated pushers mounted to the one or more configurable panels, the one or more actuated pushers being configured to push the merchandize from the one or more configurable panels to the vehicle to load the merchandize on the vehicle; and a computer controller in communication with the movable conveyor belt system, and the one or more lift systems. The computer controller is configured to transmit commands to move the movable conveyor belt system in the two degrees of freedom and to control the one or more lift systems to lift the one or more configurable panels.

Additional features and benefits of the disclosure will be set forth in the description which follows, and in part will be obvious from the description, or can be learned by practice of the herein disclosed principles. The features and benefits of the disclosure can be realized and obtained by means of the instruments and combinations particularly pointed out in the appended claims. These and other features of the disclosure will become more fully apparent from the following description and appended claims, or can be learned by the practice of the principles set forth herein. It is to be expressly understood, however, that the drawings are for the purpose of illustration and description only and are not intended as a definition of the limits of the disclosure.

DETAILED DESCRIPTION

Figure 1:
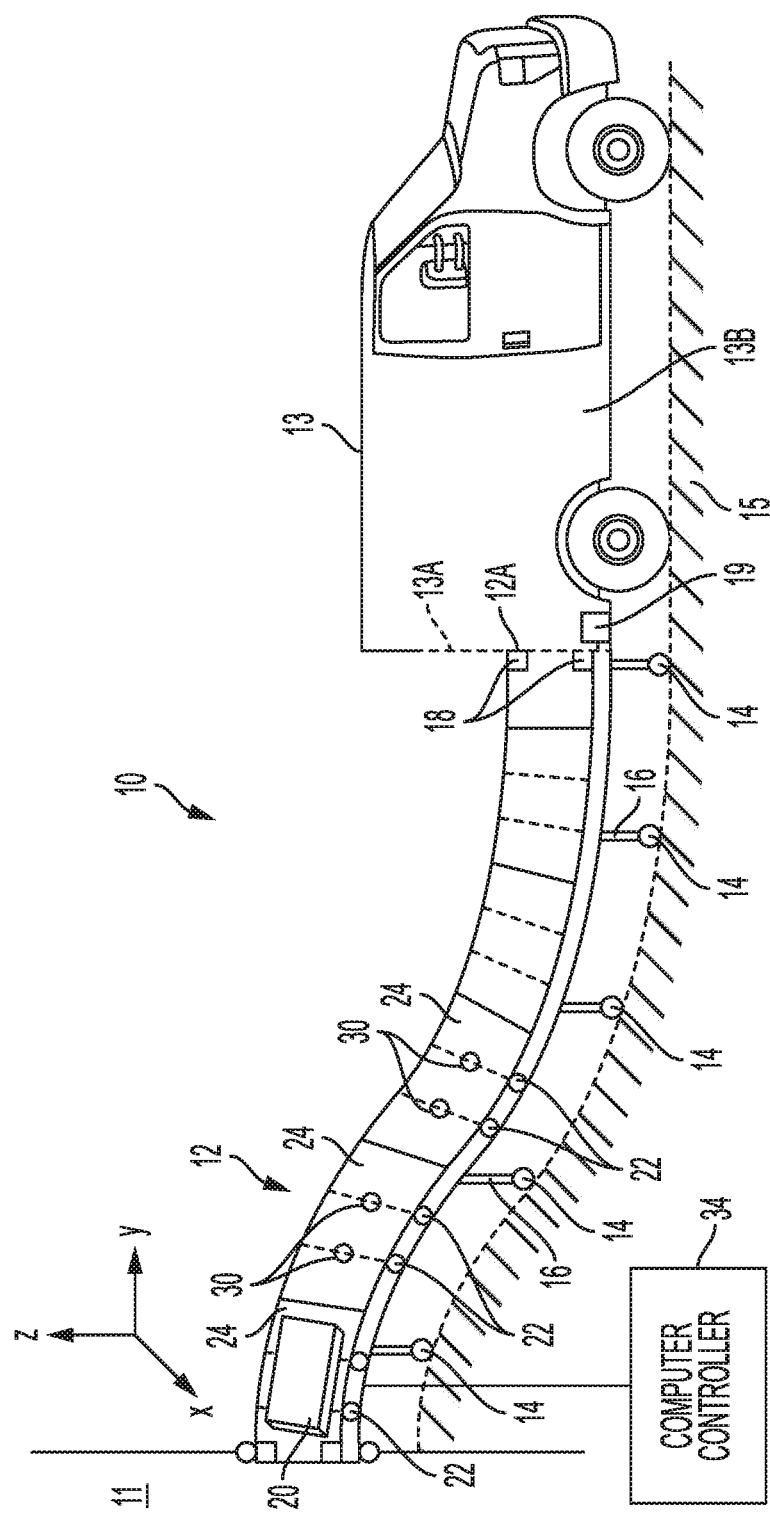
FIG. 1 shows a diagram of a system for moving items from a location to a according to an embodiment of the present disclosure.

FIG. 1 shows a diagram of a system 10 for moving items such as merchandize 20 from a location such as warehouse 11 to a vehicle 13, according to an embodiment of the present disclosure. The vehicle 13 can be any type of vehicle for transporting merchandize including, but not limited to, a truck, a van, a trailer, a container, a wagon, and a railroad freight car. The warehouse 11 can be any type of retail space, warehouse, manufacturing facility, or depot.

The system 10 includes a movable conveyor belt system 12 configured to move on a plurality of rollers or wheels 14 in two degrees of freedom (e.g., in at least the XY plane). In an embodiment, the movable conveyor belt system 12 is provided with flexibility to move freely on ground surface 15 in a serpentine motion, in the XY plane. The movable conveyor belt system 12 is configured to move on the plurality of wheels 14 in an angular range between approximately 0 deg. and approximately 360 deg. In an embodiment, the movable conveyor belt system 12 includes a frame 16 (e.g., a metal frame) supported by the plurality of rollers or wheels 14 on the ground surface 15. In an embodiment, the frame 16 is configured and arranged so as to allow the movable conveyor belt system 12 to curve and twist relatively freely at different angles and in various directions.

In an embodiment, the movable conveyor belt system 12 is provided with one or more sensors 18 configured to automatically search for a corresponding sensor 19 provided, for example, at a loading entrance 13A of vehicle 13 for loading the merchandise (e.g., package) 20. For example, the one or more sensors 18 can be provided at an end 12A of the movable conveyor belt system 12 that moves towards the vehicle 13. In an embodiment, the sensor 19 on the vehicle 13 can be configured to generate or broadcast a signal (e.g., an RF signal, a radio signal, a laser signal, etc.). The one or more sensors 18 can be configured to "listen in" and detect the signal generated by the sensor 19. The movable conveyor belt system 12 can then move to follow a direction from where the signal generated by the sensor 19 is emanating from until the movable conveyor belt (e.g., the end 12A of the movable conveyor belt system 12) reaches the loading entrance 13A of the vehicle 13, at which point the movement of movable conveyor belt system is halted. In an embodiment, a pressure or contact sensor (not shown) can also be provided on the movable conveyor belt system 12 so that when the end 12A of the movable conveyor belt system 12 touches the vehicle 13, the movement of the movable conveyor belt system 12 is halted. Although, the loading entrance 13A is shown located at the back of the vehicle 13, the loading entrance 13A can also be located on a lateral side of the vehicle 13. Furthermore, the vehicle 13 can be provided with a plurality of loading entrances 13A, for example, one loading entrance can be a back entrance and another entrance can be a lateral side entrance. For example, the type entrance 13A can be selected depending on the type of merchandize to be loaded.

In an embodiment, the system 10 further includes one or more lift systems 22 attached to the movable conveyor belt system 12 and one or more configurable panels 24 mounted to the movable conveyor belt system 12 via the one or more lift systems 22. In an embodiment, the one or more configurable panels 24 are configured to hold the merchandize 20 to be lifted by the one or more lift systems 22. In an embodiment, the one or more lift systems 22 and the one or more configurable panels 24 are attached in the vicinity or at the end 12A of the movable conveyor belt system 12. In this way, when the movable conveyor belt system 12 is moved towards the vehicle 13, the end 12A of the movable conveyor belt system 12 is moved to reach the loading entrance 13A of the vehicle. As a result, the one or more lift systems 22 and the one or more configurable panels 24 configured to carry the merchandize 20 also move towards the loading entrance 13A of the vehicle 13.

Figure 2:
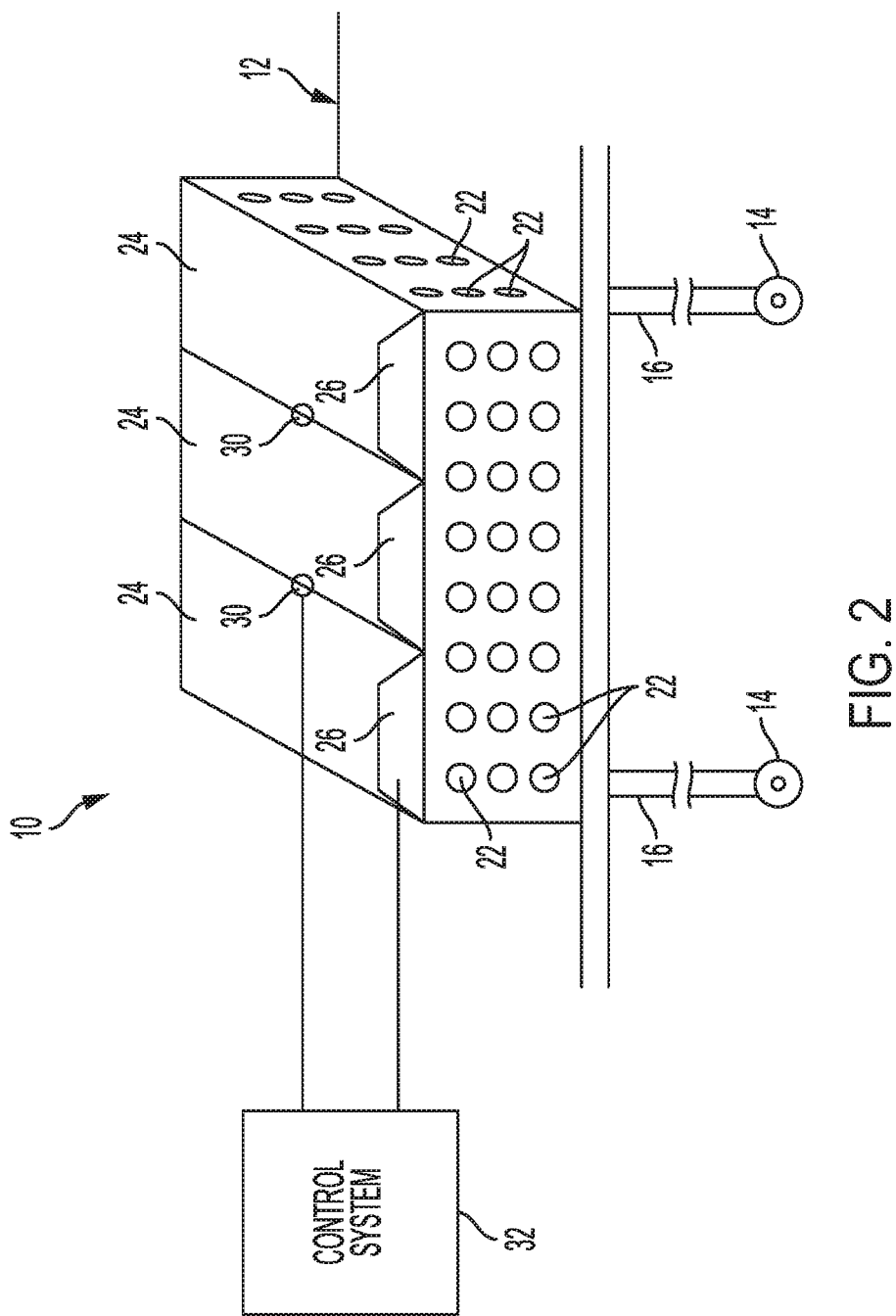
FIG. 2 shows a diagram of one of more lift systems and one or more configurable panels, according to an embodiment of the present disclosure.

FIG. 2 shows a diagram of the one of more lift systems 22 and the one or more configurable panels 24, according to an embodiment of the present disclosure. In an embodiment, the one or more configurable panels 24 are configurable in size or configurable by type of material (e.g., plastic, rubber, a composite material, etc.) for holding the merchandize 20, or both. For example, the one or more configurable panels 24 can be configurable in size in accordance with a dimension of the merchandize (e.g., package) 20. In an embodiment, a number of configurable panels 24 can be selected according to a quantity of merchandize 20 to be loaded on the vehicle 13. In an embodiment, the one or more configurable panels 24 can be configured to be detachable from the movable conveyor belt system 12. In this way, a user is able to select a number of configurable panels 24 (e.g., 1, 3, 4, etc.) according to the size or quantity of merchandize to be loaded to the vehicle 13 and/or a width of the entrance 13A of the vehicle 13. In an embodiment, the one or more configurable panels 24 can also be sized to fit the width of the loading entrance 13A of the vehicle 13. In an embodiment, the one or more configurable panels 24 can be configured to carry merchandize 20 in the form of one or more packages. For example, each panel in the one or more configurable panels 24 can be configured to carry two or more packages. In an embodiment, the two or more packages can be aligned so as to fit with a single panel in the one or more configurable panels 24.

In an embodiment, the one or more configurable panels 24 may also include one or more material sensors 30 configured to detect a type of merchandize 20 for loading to the vehicle 13. In an embodiment, the one or more material sensors 30 include a barcode sensor, a radiofrequency identification (RFID) sensor, a temperature sensor, or any combination thereof. The barcode sensor and/or the RFID sensor can be configured to read information encoded on a barcode or an RFID tag provided on the merchandize 20, and the temperature sensor can be configured to detect a temperature of the merchandize 20. For example, the information encoded on the barcode or the RFID tag may include dimensions of a container or package containing the merchandize 20, or a type of merchandize (e.g., cold or frozen goods), or both. In an embodiment, a control system 32 in communication with the one or more material sensors 30 (the barcode sensor, the RFID sensor, and/or the temperature sensor) and in communication with the one or more pushers 26 to control the one or more pushers 26 to move the merchandize 20 in accordance with the information read by the barcode or RFID sensors or in accordance with a temperature detected by the temperature sensor. For example, the merchandize 20 can be moved to a temperature regulated vehicle 13 when a freeze or cold temperature is detected from the merchandize 20. For example, the merchandize can be moved to a desired or assigned vehicle 13 when the information collected from the RFID tag or the barcode indicates that the merchandize 20 contains hazardous chemicals, etc.

In an embodiment, the one or more actuated pushers 26 are configured to extend into an interior chamber 13B of the vehicle 13 to load the merchandize 20 inside the vehicle 13 (shown in FIG. 1). In an embodiment, the one or more actuated pushers 26 enable a lateral transfer of the merchandize 20 from the one or more configurable panels 24 to the interior chamber 13B of vehicle 13. In an embodiment, the one or more actuated pushers 26 may also enable lateral transfer of the merchandize 20 from the one or more configurable panels 24 to another one or more configurable panels on another movable conveyor belt system (not shown). In an embodiment, the one or more actuated pushers 26 may comprise one or more plates actuated by a motor to push the merchandize 20. In another embodiment, the one or more actuated pushers 26 can be a robotic arm to provide further access to the interior chamber 13B of the vehicle 13. In an embodiment, the size or number of configurable panels and/or the number or the type of actuated pushers 26 can be configured in accordance with a type of rack system installed in the vehicle 13 for holding the merchandize 20. In an embodiment, the system 10, including the movable conveyor belt system 12, the one or more lift systems 22, and the one or more configurable panels 24, can be configured to sense when one or more racks in the rack system inside the vehicle 13 is full.

In an embodiment, the one or more lift systems 22 can be a hydraulic, a mechanical or an electrical based lift system. The one or more lift systems 22 are configured to move up or down to allow the one or more configurable panels 24 to reach a desired loading level at the loading entrance 13A of the vehicle 13. After the one or more configurable panels 24 reach a desired loading level at the loading entrance 13A of the vehicle 13, the one or more actuated pushers 26 can be actuated to transfer of the merchandize 20 (for example, laterally) from the one or more configurable panels 24 to the interior chamber 13B of vehicle 13.

Figure 3:
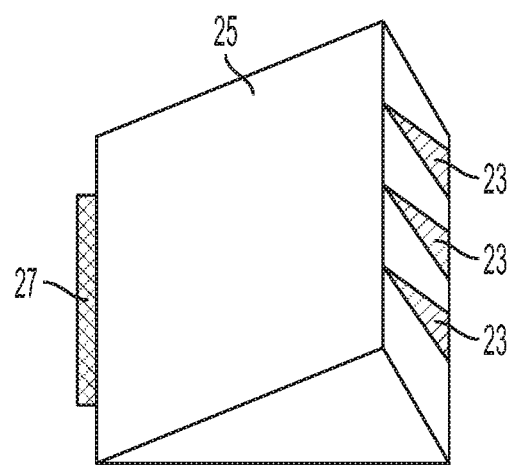
FIG. 3 shows a diagram of one of more lift systems and one or more configurable panels, according to another embodiment of the present disclosure.

FIG. 3 shows a diagram of one of more lift systems 23 and one or more configurable panels 25, according to another embodiment of the present disclosure. As shown in FIG. 3, the one or more configurable panels 25 are disposed in a wedge like configuration and are raised or lowered on one side by the one or more lift systems 23. A sensor 27 is provided at another side to detect the type or size of merchandize 20 and adjust a height of the one or more configurable panels 25 with the one or more lift systems 23 accordingly so as to load the merchandize 20 on the vehicle 13. For example, this configuration can be used at an end 12A of the system 10 so as to provide height adjustment to accommodate the height of the vehicle 13.

Returning to FIG. 1, in an embodiment, the system 10 further includes a computer controller 34. The computer controller 34 is in communication with the movable conveyor belt system 12, and the one or more lift systems 22. The computer controller 34 is configured to transmit commands to move the movable conveyor belt system 12 in the two degrees of freedom (XY) and to control the one or more lift systems 22 to lift the one or more configurable panels 24 in a third degree of freedom (Z). As it can be appreciated from the above paragraphs, the vehicle 13 does not need to be very close to or at an entrance of the warehouse 11, the vehicle 13 can simply be parked within an extension or distance range of the movable conveyor belt system 12. The movable conveyor belt system 12, the one or more lift systems 22, and the one or more configurable panels 24 can be operated to extend to reach the loading entrance 13A of the vehicle 13. In an embodiment, once the driver of the vehicle 13 parks the vehicle 13 and opens the door(s) of the loading entrance 13A, the movable conveyor belt system 12, the one or more lift systems 22, and the one or more configurable panels 24 can automatically search the loading entrance 13A and load the merchandize 20 to the vehicle 13 without any or with minimal manual intervention.

The term "computer system," "computer controller" or "control system" is used herein to encompass any data processing system or processing unit or units. The computer system, computer controller or control system may include one or more processors or processing units. The computer system can also be a distributed computing system. The computer system may include, for example, a desktop computer, a laptop computer, a mobile computing device such as a PDA, a tablet, a smartphone, etc. A computer program product or products may be run on the computer system to accomplish the functions or operations described in the above paragraphs. The computer program product includes a computer readable medium or storage medium or media having instructions stored thereon used to program the computer system to perform the functions or operations described above. Examples of suitable storage medium or media include any type of disk including floppy disks, optical disks, DVDs, CD ROMs, magnetic optical disks, RAMs, EPROMs, EEPROMs, magnetic or optical cards, hard disk, flash card (e.g., a USB flash card), PCMCIA memory card, smart card, or other media. Alternatively, a portion or the whole computer program product can be downloaded from a remote computer or server via a network such as the internet, an ATM network, a wide area network (WAN) or a local area network.

Stored on one or more of the computer readable media, the program may include software for controlling both the hardware of a general purpose or specialized computer system or processor. The software also enables the computer system or processor to interact with a user via output devices such as a graphical user interface, head mounted display (HMD), etc. The software may also include, but is not limited to, device drivers, operating systems and user applications. Alternatively, instead or in addition to implementing the methods described above as computer program product(s) (e.g., as software products) embodied in a computer, the method described above can be implemented as hardware in which, for example, an application specific integrated circuit (ASIC) or graphics processing unit or units (GPU) can be designed to implement the method or methods, functions or operations of the present disclosure.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

Although the embodiments of disclosure have been described in detail for the purpose of illustration based on what is currently considered to be the most practical, it is to be understood that such detail is solely for that purpose and that the present disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed:

1. A system for moving merchandize from a warehouse to a vehicle, the vehicle having a loading entrance and a sensor provided at the loading entrance, the system comprising:

a movable conveyor belt system configured to move on a plurality of rollers in two degrees of freedom, the conveyor belt system being provided with one or more sensors configured to search for and communicate with the sensor provided at the loading entrance of the vehicle for loading the merchandize;

one or more lift systems attached to the movable conveyor belt system;

one or more configurable panels mounted to the movable conveyor belt system via the one or more lift systems, the one or more configurable panels being configured to hold merchandize to be lifted by the one or more lift systems;

one or more actuated pushers mounted to the one or more configurable panels, the one or more actuated pushers being configured to push the merchandize from the one or more configurable panels to the vehicle to load the merchandize on the vehicle; and a computer controller in communication with the movable conveyor belt system, and the one or more lift systems, the computer controller being configured to transmit commands to move the movable conveyor belt system in the two degrees of freedom and to control the one or more lift systems to lift the one or more configurable panels.

2. The system according to claim 1, wherein the one or more actuated pushers are configured to extend into an interior chamber of the vehicle to load the merchandize inside the vehicle.

3. The system according to claim 1, wherein the movable conveyor belt system comprises a frame supported by the plurality of rollers on a ground surface.

4. The system according to claim 1, wherein the one or more lift systems are configured to move up or down to allow the one or more configurable panels to reach a desired loading level at a loading entrance of the vehicle.

5. The system according to claim 1, wherein the one or more configurable panels are configurable in size or configurable by type of material for holding the merchandize, or both.

6. The system according to claim 1, wherein the one or more configurable panels comprise one or more material sensors configured to detect a type of merchandize for loading to the vehicle.

7. The system according to claim 6, wherein the one or more material sensors comprise a barcode sensor, a RFID sensor, a temperature sensor, or any combination thereof, the barcode sensor, the RFID sensor being configured to read information encoded on a barcode or an RFID tag provided on the merchandize and the temperature sensor being configured to detect a temperature of the merchandize.

8. The system according to claim 7, further comprising a control system in communication with the barcode sensor, the RFID sensor, or the temperature sensor and in communication with pushers provided on the one or more platform to control the one or more pushers to move the merchandize in accordance with the information read by the barcode or RFID sensors or in accordance with a temperature detected by the temperature sensor.

9. The system according to claim 1, wherein the sensor provided at the loading entrance of the vehicle is configured to generate a signal and the one or more sensors of the conveyor belt system are configured to detect said signal.

10. A system for moving merchandize from a warehouse to a vehicle, the vehicle having a loading entrance and a sensor provided at the loading entrance, the system comprising:
a movable conveyor belt system configured to move on a plurality of rollers in two degrees of freedom, wherein the conveyor belt system is provided with one or more sensors configured to search for and communicate with the sensor provided at the loading entrance of the vehicle for loading the merchandize;
one or more lift systems attached to the movable conveyor belt system; and
one or more configurable panels mounted to the movable conveyor belt system via the one or more lift systems, the one or more configurable panels being configured to hold merchandize to be lifted by the one or more lift systems.

11. The system according to claim 10, further comprising one or more actuated pushers mounted to the one or more configurable panels, the one or more actuated pushers being configured to push the merchandize from the one or more configurable panels to the vehicle to load the merchandize on the vehicle.

12. The system according to claim 11, wherein the one or more actuated pushers are configured to extend into an interior chamber of the vehicle to load the merchandize inside the vehicle.

13. The system according to claim 10, wherein the movable conveyor belt system comprises a frame supported by the plurality of rollers on a ground surface.

14. The system according to claim 10, wherein the one or more lift systems are a hydraulic, a mechanical or an electrical based lift system.

15. The system according to claim 10, wherein the one or more lift systems are configured to move up or down to allow the one or more configurable panels to reach a desired loading level at a loading entrance of the vehicle.

16. The system according to claim 10, wherein the one or more configurable panels comprise one or more material sensors configured to detect a type of merchandize for loading to the vehicle.

17. The system according to claim 16, wherein the one or more material sensors comprise a barcode sensor, a RFID sensor, a temperature sensor, or any combination thereof, the barcode sensor, the RFID sensor being configured to read information encoded on a barcode or an RFID tag provided on the merchandize and the temperature sensor being configured to detect a temperature of the merchandize.

18. The system according to claim 17, further comprising a control system in communication with the barcode sensor, the RFID sensor, or the temperature sensor and in communication with pushers provided on the one or more platform to control the one or more pushers to move the merchandize in accordance with the information read by the barcode or RFID sensors or in accordance with a temperature detected by the temperature sensor.

19. The system according to claim 10, further comprising a computer controller in communication with the movable conveyor belt system, and the one or more lift systems, the computer controller being configured to transmit commands to move the movable conveyor belt system in the two degrees of freedom and to control the one or more lift systems to lift the one or more configurable panels.

20. The system according to claim 10, wherein the sensor provided at the loading entrance of the vehicle is configured to generate a signal and the one or more sensors of the conveyor belt system are configured to detect said signal.

* * * * *